Jan. 28, 1941. A. G. DEAN 2,229,798
VENTILATOR
Filed Feb. 11, 1937

INVENTOR.
ALBERT G. DEAN.
BY
John P. Tarbox
ATTORNEY.

Patented Jan. 28, 1941

2,229,798

UNITED STATES PATENT OFFICE 2,229,798

VENTILATOR

Albert G. Dean, Narberth, Pa., assignor to Edward G. Budd Manufacturing Company, Philadelphia, Pa., a corporation of Pennsylvania Application February 11, 1937, Serial No. 125,175

4 Claims. (Cl. 98—20)

This invention relates to improvements in exhaust air ventilators and more particularly to an improved construction for exhausting the air from the end car of a streamline train.

The tendency toward streamlining trains and particularly the end car in order to reduce eddy currents and skin friction has made it increasingly difficult to remove the air from the interior of this car. Typical installations, such as heretofore known, are entirely unsatisfactory in that they have an objectionable appearance and for the most part are difficult to adapt for a positive discharge of air.

It is one of the objects of the present invention to provide an improved exhaust air ventilator for a streamline train which ventilator is efficient for positive discharge of air at various car speeds and in addition is of decorative appearance.

Another and more specific object of the invention is to provide an improved exhaust air ventilator which is suitably mounted in connection with the back-up or tail light, all of which can be conveniently mounted on the compound curved roof portion at the rear of the train.

A further object of this invention is to provide a sharply upwardly projecting baffle for an exhaust air ventilator which is mounted on the curved portion of a vehicle roof in such a manner that it does not actually project above the roof line although its effective projection is very substantial for an effective removal of air at all speeds of the vehicle.

Figure 1:
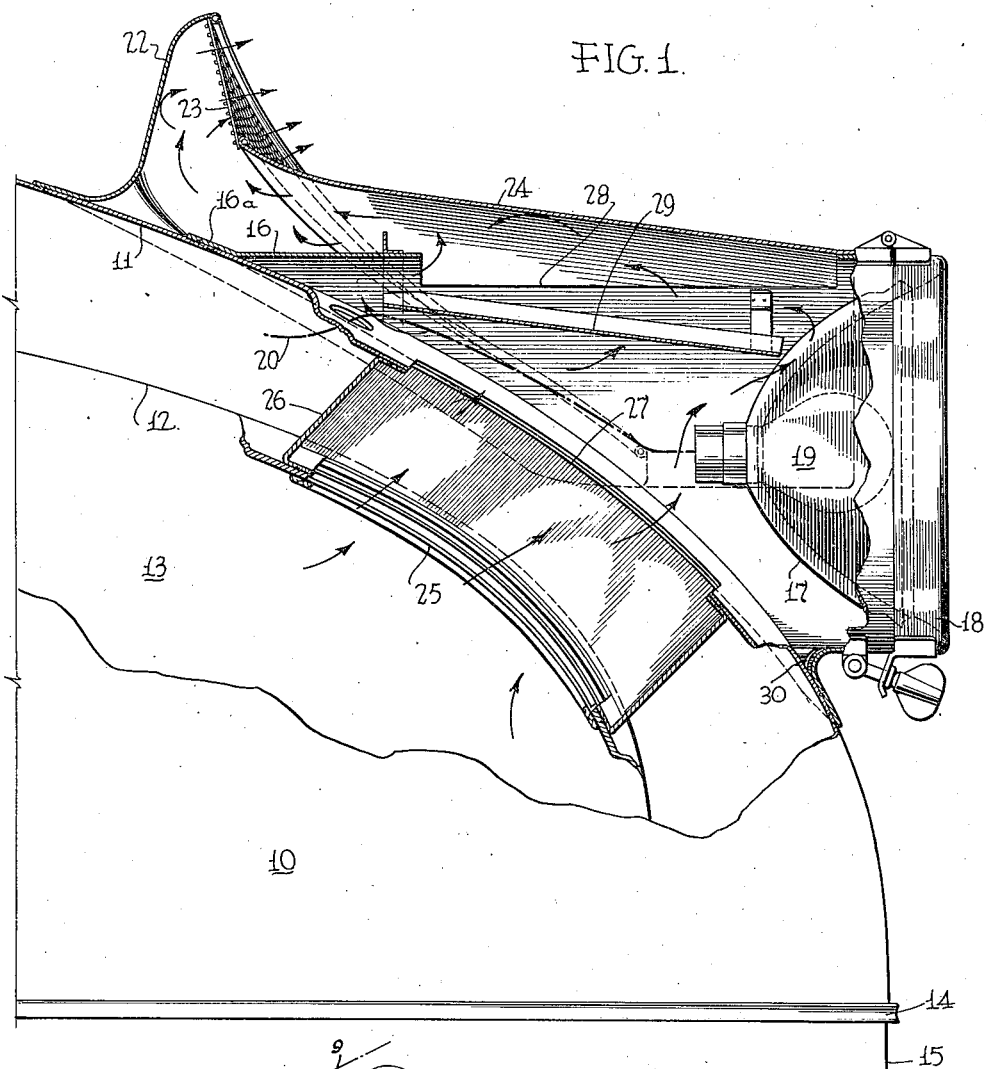
Figure 2:
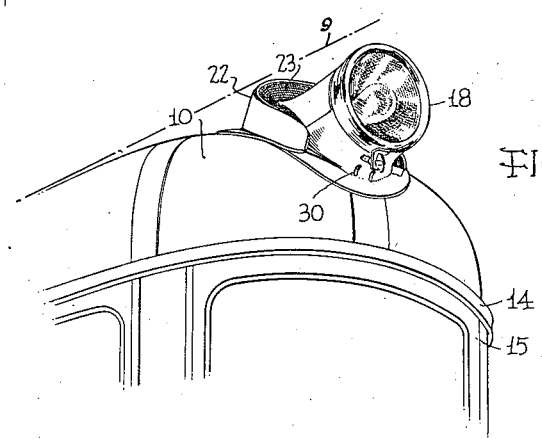

Further objects and advantages of my invention will appear from the following description of a preferred form of embodiment thereof taken in conjunction with the attached drawing which is illustrative thereof and, in which, Fig. 1 is an end elevation of the top portion of the rear car of a streamline train with parts in section showing the internal construction of the air ducts, and, Fig. 2 is a perspective view of the end of the car.

The top, rear portion of a rail car 10 as generally shown in Fig. 1, has the roof 11, below which is the ceiling 12 of the interior 13 of the car body. The top rail of the side frame is indicated at 14, with the rear end of the car being generally indicated at 15.

The roof 11 of this part of the streamline car is generally curved rearward and downward in accordance with good aerodynamic practice and has the general shape of a symmetrical quarter section of an oblate spheroid. It is provided with a backing or tail light, however, such tail light including a substantially cylindrical barrel 16, suitably welded by its flanges 16a to the roof. A reflector 17, and a suitable lens carrying door 18, are mounted at the end of the barrel 16 and the light 19 is conveniently connected to a power source by conduit 20. The backing light does not materially interfere with the streamline characteristics of the roof construction, especially as it is somewhat below the top of the roof line as is indicated by the top center line 9 extended in Fig. 2.

In order to remove the vitiated air from the rear of the car body interior 13 which is otherwise sealed, I find it desirable to interrupt the normal flow of air across the car roof. One effective structure for this purpose is constituted by a ventilator casing comprising a baffle 22 and shell or shroud 24 built up above the backing light the shell being faired into the lower part of the backing light barrel 16. It is spaced above the top of the light, to form a conduit 31 through which exhaust air may pass.

The principal parts of this ventilator casing include the sharply, upwardly, projecting baffle 22 and the shell 24. The baffle has an imperforate forward wall (in the normal direction of vehicle movement), such baffle extending substantially perpendicular from the rear contour nearly to the maximum roof elevation and extending around the light barrel in a substantially horse shoe shape. Being located on the downwardly curved part of the roof, however, it has a substantial elevation without extending beyond the maximum car height and will interrupt the air stream, which to a considerable extent bends around the rear sloping and curved roof contour, so as to cause a low pressure area to the rear. It is to be understood that with a long train, the skin friction is such that there is usually some eddying of the air but this would normally produce a positive pressure on the roof rather than a vacuum. It is therefore desirable to have the sharp upwardly projecting baffle to positively set up a low pressure area immediately behind the baffle.

The ventilator casing includes a substantially semi-cylindrical shroud 24 for the tail light, such shroud being spaced below the top of the baffle 22 and ending short thereof, thus leaving a rearwardly facing opening between the forward edge of the shroud and the outer semi-circular edge of the baffle which may be closed by a wire grille 23 to form an opening of lunar or crescent shape. Communication between the crescent shaped grille 23 and the grille opening 25 on the interior of the car is completed by a box conduit 26 extending to an opening 27 in the roof beneath or within the light barrel and an opening 28 in the top of the light barrel for a direct passage into the shroud or shell 24 and thence around the forward edge of the shell to the grille 23.

While no shutters are shown, it is obvious that they may be used for regulation of the volume of air discharged. To prevent rain from entering the car through this passage, an inclined baffle 29 is provided under the light barrel opening 28, and the water which may collect thereon is discharged out of holes 30 located below the lower edge of the baffle as indicated in Fig. 2. This baffle extends beyond the opening 28 of the light barrel 16 so that all entering moisture will be intercepted.

With this form of ventilator casing, the flow of air over the streamlined roof will be interrupted by the baffle 22 which in turn will set up a low pressure area immediately to the rear, and such condition will draw air out of the car interior. As shown in Fig. 2, the grille opening extends around the sides of the back-up light, and a sufficiently large cross section is obtained to insure adequate ventilation. Such a construction is effective regardless of train speeds, and the conduit being entirely open to the outside, there will be an exhaust even when the car is stopped because of the slight above atmospheric pressure within established by the air conditioning apparatus usually provided.

Mounting the baffle and grille around the backing light, places it in the most effective position for setting up eddy currents, and yet does not detract from the appearance of the car body. As clearly seen in Fig. 2, the structure artistically blends with the back-up light although aerodynamically, it interrupts the air flow. This is due to a large extent to the fact that the observer is usually on a lower level than the light and does not observe the upward projection as it actually appears as shown in Fig. 1. This has the double advantage of being inconspicuous but effective. Furthermore, such ventilator can be kept entirely within the elevation of the car body.

While I have shown a preferred form of embodiment of my invention, I am aware that modifications may be made thereto, and I thereto desire a broad interpretation of my invention within the scope and spirit of the description herein, and of the claims appended hereinafter.

What is claimed is:

1. A ventilating device for a vehicle body comprising a baffle mounted on the roof thereof, said baffle projecting upwardly and being imperforate on the side in the direction of normal movement and flaring rearwardly and downwardly and terminating at its rear end approximately at the edge of the roof, a roof shroud to the rear of and spaced from said baffle and forming an opening therewith, said opening being in communication with a chamber in the vehicle to be evacuated and means to prevent the entrance of water in the chamber to be evacuated, including a duct for discharge of rain water from said open portion.

2. A closed vehicle body having a streamline roof, a ventilator mounted on said roof and in communication with the interior of said vehicle body, said ventilator having at its forward open end in the normal direction of the movement of the vehicle an imperforate upwardly projecting substantially semi-circular baffle, a rounded shroud extending rearwardly from the baffle and into contact with the roof but spaced from the baffle at the forward end, and forming a chamber, the shroud being spaced below the top of said baffle and inwardly of the edges thereof leaving a crescent shape opening to said chamber.

3. In combination with the downwardly curved roof of a vehicle having an interior, the air of which is to be exhausted, of a ventilator casing having a rearwardly flared baffle and a shroud mounted on the curved portion of the roof, said shroud being spaced above said roof and intermediate of said baffle and forming a conduit leading into the rear of said baffle and a substantially vertical exhaust opening between the shroud and the outer edge of said baffle, said baffle having a substantial elevation with respect to the roof surface but being below the topmost line of the roof.

4. A ventilator for the rear sloping surface of a rail car roof comprising a baffle extending substantially perpendicular from said roof at the forward side of said ventilator, a shell covering a portion of said roof and having a forward opening guarded from the air stream over said roof by the lower half of said baffle, said forward opening and said baffle forming a substantially vertical rearwardly directed opening and conduit means connecting the space within said shell to the car interior whereby upon forward car movement the low pressure area behind the baffle and above the shell will draw air from the forward opening in said shell and from within the car.

ALBERT G. DEAN.